United States Patent [19]
Alexander

[11] 3,919,916

[45] Nov. 18, 1975

[54] DRIVE RIVET ASSEMBLY

[75] Inventor: John Bert Alexander, Hoffman Estates, Ill.

[73] Assignee: Illinois Tool Works Inc., Chicago, Ill.

[22] Filed: Sept. 12, 1974

[21] Appl. No.: 505,399

[52] U.S. Cl. .......................... 85/68; 85/10 E; 85/84; 85/23

[51] Int. Cl.² .......................................... F16B 13/06

[58] Field of Search .............. 85/68, 84, 85, 83, 23, 85/26, 31, 10 E, 10 R

[56] References Cited

UNITED STATES PATENTS

| | | | |
|---|---|---|---|
| 2,150,788 | 3/1939 | Shippee et al. | 85/13 |
| 2,817,380 | 12/1957 | Knohl | 151/37 |
| 2,855,817 | 10/1958 | Kopf | 85/10 E |
| 3,188,905 | 6/1965 | Millet | 85/84 |
| 3,283,642 | 11/1966 | Ott | 85/83 |
| 3,390,713 | 7/1968 | Gutshall | 151/35 |
| 3,511,128 | 5/1970 | Garrison | 85/23 |
| 3,626,803 | 12/1971 | Liebig | 85/72 |
| 3,898,964 | 8/1959 | Masters | 85/23 |

FOREIGN PATENTS OR APPLICATIONS

| | | | |
|---|---|---|---|
| 737,968 | 10/1955 | United Kingdom | 85/10 E |
| 966,781 | 8/1964 | United Kingdom | 85/10 E |
| 585,500 | 10/1959 | Canada | 85/10 E |
| 565,770 | 4/1958 | Belgium | 85/10 E |

*Primary Examiner*—Marion Parsons, Jr.
*Attorney, Agent, or Firm*—T. W. Buckman; R. W. Beart

[57] ABSTRACT

A rivet assembly capable of being driven, piercing a workpiece and set with a single impact blow. The assembly includes a body member with a shank having an enlarged head at one end and a tapered penetrating point at the other end. A bore is provided in the shank to accept a drive pin with the bottom wall of the bore serving to transmit driving force from the drive pin to the body member. The shank will be weakened longitudinally and provided with a washer device or radial protuberances in the vicinity of the bottom wall to prevent radial expansion of the shank prior to penetration of the workpiece.

11 Claims, 11 Drawing Figures

DRIVE RIVET ASSEMBLY

BACKGROUND OF THE INVENTION

The invention relates generally to fasteners of the type that may be installed from only one side of work material. The invention more particularly relates to a fastener that is capable of piercing a hole in a workpiece and expanding behind the workpiece as a result of a single operating stroke of a tool.

Blind fasteners are currently utilized to attach a plurality of plates by first drilling or punching a hole in the plates and then inserting a rivet body having a bore in a drive pin situated in the bore. After the rivet body has been so positioned through the aperture in the plates, a driving blow is imparted to the drive pin causing the entering end of the rivet body to expand beneath the plates. This practice is obviously time consuming in that it requires a separate operation to prepare the necessary hole into which the rivet body may be inserted.

Efforts to provide a blind fastener which is capable of piercing a hole in a workpiece and expanding therebeneath in one operating stroke have not met with success. One of the reasons for the lack of success is the fact that a single impact blow imparted to the drive pin tends to cause the fastener body to prematurely expand, thus reducing the amount of energy available to pierce and, in fact, increasing the contact area of the penetrating point on a rivet body.

Existing drive rivet assemblies are not generally adaptable for use with driving apparatuses designed for high volume attachment techniques. The prior art fasteners conventionally have a circular head and a concentric shank extending beneath the head. This configuration in and of itself will not allow proper guidance to be provided the fastener shank as it travels through the nosepiece chamber.

SUMMARY OF THE INVENTION

The present invention contemplates a fastener device with a body incorporating a work abutting head, axial bore, penetrating point and longitudinally weakened shank. The body is driven through a workpiece through the use of a drive pin located in the bore which will be driven through the bottom wall of the bore when the head abuts the workpiece. The continued movement of the pin through the bottom wall causes the lower shank portion to radially expand beneath the workpiece. An important aspect of the invention is the incorporation of means around the shank in the vicinity of the bottom wall of the bore to prevent the shank from radially expanding until the body has pierced and the head abuts the workpiece. The means for preventing expansion may be devices such as washers or integral radial protuberances.

The radially extending devices will also contribute to the guidance of the fastener as it is driven through a nosepiece chamber of a power driver. The radial devices may be in sliding contact with the inner walls of the driving chamber until they contact the upper surface of the workpiece. This construction insures that the fastener will remain vertically positioned relative to the workpiece surface.

It is, therefore, an object of the invention to provide a blind fastening device which is capable of piercing a workpiece and expanding behind the workpiece as a result of a single impact blow.

Another object of the invention is the provision of a rivet-type fastener that can be guided and confined in the nosepiece of a power driving apparatus.

Still a further object of the invention is the provision of a drive fastener which will pierce the hole in a workpiece and expand behind the workpiece utilizing a minimum of driving energy.

These and other objects and advantages of the present invention will become more apparent by reference to the following description of the invention as illustrated in the accompanying drawings.

DESCRIPTION OF THE PREFERRED EMBODIMENT

Figure 1:
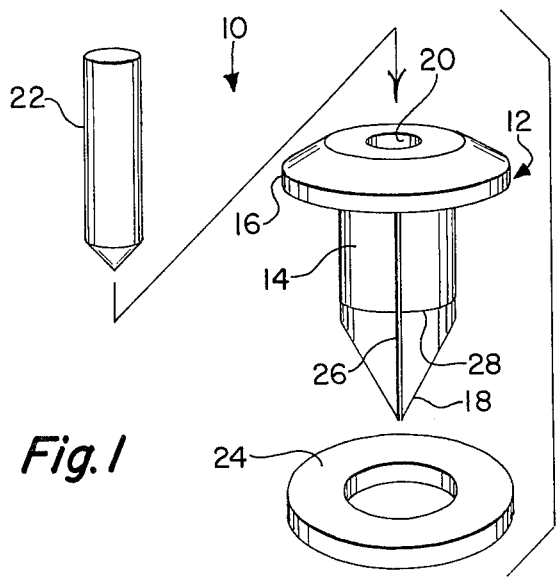
FIG. 1 is an exploded view of certain components embodying the rivet assembly.

The invention may be described with reference to the drawings wherein like reference numerals throughout the various views and embodiments are intended to designate similar elements or components. Referring to the drawings, the rivet assembly 10 shown in FIG. 1 includes a body member 12 with a shank 14, an enlarged head 16 at one end and a tapered penetrating point 18 at the other end. An axial bore 20 is formed in the body extending from the head portion and terminating axially above the penetrating point. A drive pin member 22 is adapted to be associated within the bore 20. A ring-like device 24 is adapted to be closely fitted around the shank 14 at a position and for a purpose to be described later herein.

A longitudinal slot or longitudinal shank weakening means 26 is provided from the penetrating point of the body and extends upwardly at least through the bottom wall of the bore.

Figure 7:
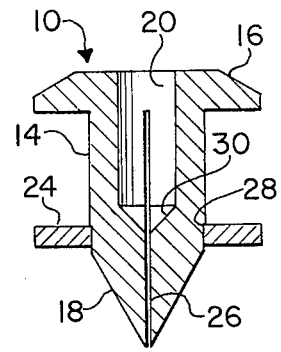
FIG. 7 is a cross-sectional view taken along line 7—7 of FIG. 6.

As best shown in FIG. 7, the axial bore 20 will terminate with a bottom wall portion 30 which is axially above the penetrating extremity of the point 18. The washer device 24 is preassembled on the shank 14 at an axial location generally coinciding with the axial location of the bottom wall 30 of the bore. The positionment of the washer at such a location may be insured through the use of slight shoulder means or protuberances 28 formed on the shank. These slight shoulders, however, will not prevent the washer from being forced up the shank when the washer abuts the workpiece. The washer device 24 may be closely fitted upon the lower portion of the shank so that it may be frictionally retained and handled as an assembly.

Figure 2:
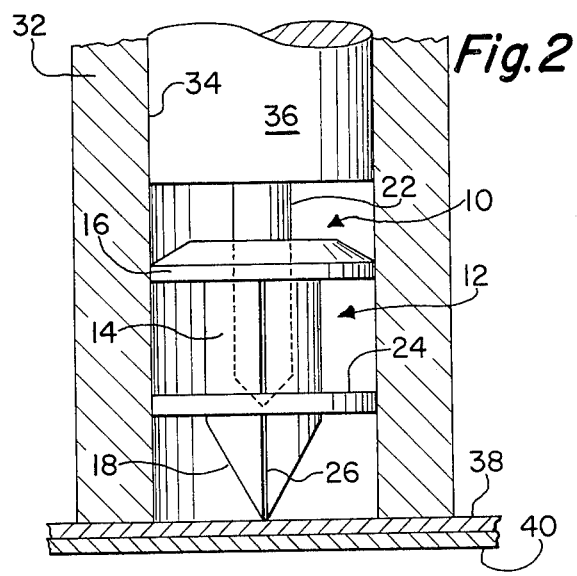
FIG. 2 is a partial axial section view of a driving tool showing a side view of the rivet assembly prior to the penetration of a workpiece.
Figure 5:
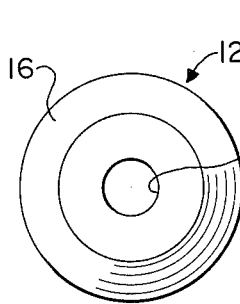
FIG. 5 is a head end view of the rivet assembly embodiment of FIGS. 1–4 shown without the associated drive pin.
Figure 6:
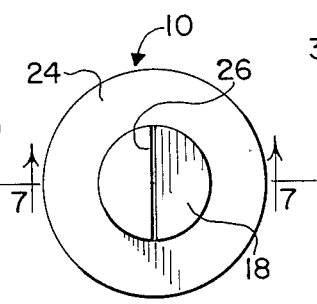
FIG 6 is a point end view of the rivet assembly embodiment shown in FIGS. 1–4 without the associated drive pin.

The operation and inventive features of the invention may best be described with reference to FIGS. 2–4. The rivet assembly 10 will have particular advantages for use with a power driving device in which a drive ram 36 contacts the drive pin member 22 with an impact blow after the assembly 10 has been positioned in a nosepiece 32. The washer member 24 will be constructed of a rigid material, such as steel, and will preferably have an outer diameter substantially equal to the outer diameter of the head 16. As the ram 36 contacts the drive pin 22, the entire rivet assembly will be driven downwardly through the nosepiece with the outer peripheries of the head 16 and the washer 24 slidingly engaging the inner walls 34 of the nosepiece.

The impact force of the ram will thus be transmitted directly from the drive pin to the bottom wall 30 of the bore. Since the rigid washer device 24 is positioned in the vicinity of the bottom wall 30, the shank will be constrained from expanding radially during the initial period of the driving sequence and the bottom wall will thus act solely as driving surfaces. The washer, being of a rigid material, should provide a hoop strength which, in and of itself, prevents the pin 22 from being driven through the bottom wall to prematurely expand the body. However, the engagement of the washer with the inner wall of the nosepiece chamber will also contribute in the constraint necessary to insure proper operation of the fastener.

Figure 3:
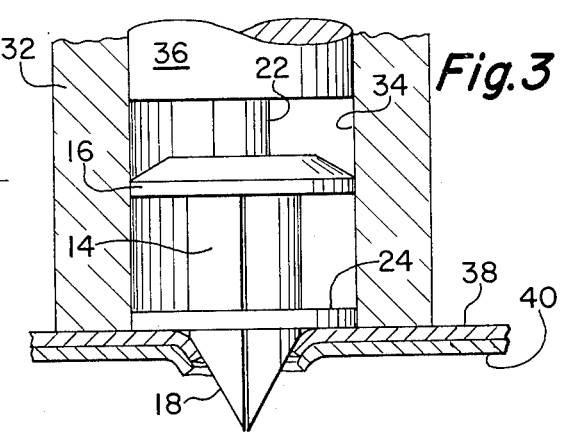
FIG. 3 is a view similar to FIG. 2 showing the assembly after it has penetrated the workpiece and prior to being set.
Figure 4:
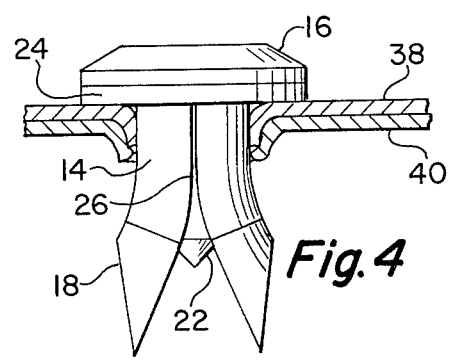
FIG. 4 is a side view of the rivet assembly after it has been set.

As shown in FIG. 3, continued movement of the ram 36 causes the assembly 10 to pierce workpieces 38 and 40. The drive pin 22 is constrained from being driven completely through the body as a result of the washer device 24. Once the point 18 has pierced the workpieces, the washer 24 will abut the upper workpoiece 38 and be forced upwardly on the shank as the body member is driven downwadly through the washer and the workpieces. The washer will be finally positioned between the bearing surface of the head and the workpiece 38 as shown in FIG. 4. Once the head 16 and washer 24 abut the workpiece 38, the drive pin 22 will continue to move longitudinally of the shank and be forced through the bottom wall of the bore with the wall surfaces 30 acting as camming means to radially expand the lower section of the shank. Longitudinal slots 26 facilitate this radial expansion which was heretofore constrained.

It should be understood that for purposes of this invention the drive pin means 22 could be integral with the driving ram 36 of the power driver with the operation of the invention remaining the same.

Figure 8:
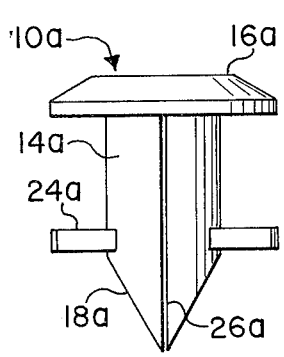
FIG. 8 is a side view of an alternate embodiment of a rivet assembly without the associated drive pin.
Figure 9:
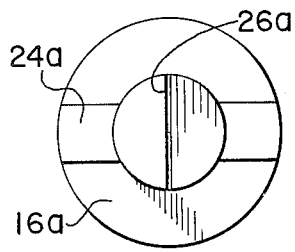
FIG. 9 is a point end view of the embodiment shown in FIG. 8.

While the preferred embodiment utilizes a washer device surrounding a slotted shank, it should be understood that other forms of radial protuberances may be incorporated in the invention to constrain the longitudinally weakened shank from expanding until the head of the fastener body abuts the workpieces. Fastener assembly 10a shown in FIGS. 8 and 9 illustrates such a device in which wings or tabs 24a are integrally but frangibly formed on the shank on opposite sides of a slot 26a. The wings 24a will be positioned at essentially the same axial location as the bottommost wall of the bore. In operation, the fastening device 10a will function in generally the same manner as fastener 10. The wings 24a will slidingly abut the inner wall of the nosepiece to prevent the shank from radially expanding and permit the drive pin to drive the rivet body 14a through the workpiece.

When the point 18a has penetrated the workpiece, the wings 24a will abut the workpiece and fracture from the side surfaces of the shank thus allowing the shank to be completely driven through the workpieces until the head 16a abuts and prevents further axial motion of the body. At this moment the drive pin continues to be driven through the bottom wall of the bore radially expanding the shank beneath the workpiece.

Figure 10:
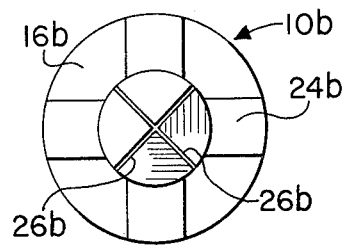
FIG. 10 is a point end view of an alternate embodiment of the assembly shown in FIG. 8.

FIG. 10 shows a modified version of an assembly which utilizes integral tabs wherein four such tabs 24b are positioned about the shank and wherein a pair of intersecting slots 26b are formed longitudinally of the shank. It is thus apparent that the number of weakened areas or slots or point configuration of the body can be varied and still come within the scope and intent of the invention.

Figure 11:
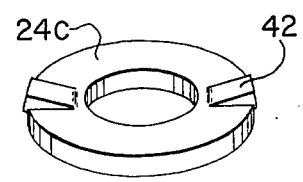
FIG. 11 is a perspective view of a modified form of a washer portion for the rivet assembly.

While the primary function of the washer-like device 24 is to constrain the radial expansion of the rivet body while being driven, it could incorporate a number of secondary functions. For example, FIG. 11 shows such a washer body 24c incorporating spring tabs 42 to provide a spring means beneath the head of the rivet assembly. This will allow the rivet assembly to provide a resilient clamping force to the workpieces. The washer device could also incorporate sealing or locking features if so desired.

The ability of a fastener, constructed in accordance with the invention, to be constrained from prematurely expanding allows such a fastener to be driven with the most efficient use of driving force. It will be apparent that the impact force from a ram applied directly to the drive pin will not be utilized to spread the body until the final portion of the power stroke. The early stages of the power stroke may be utilized solely to pierce the workpiece since the rivet body is entirely confined and constrained from spreading until after the workpiece has been pierced and the head contacts the work surface.

While reference has been made to specific embodiments of the invention, various modifications and alterations will become apparent to those skilled in the art in light of the foregoing description. Accordingly, it is intended to embrace all such alternatives, modifications and variations as fall within the spirit and broad scope of the appended claims.

I claim:

1. A rivet assembly capable of being driven, piercing a workpiece and set in a single operation, the assembly including a body member with a shank, a work engaging head at one extremity thereof and a work penetrating means at the other extremity, the body having a bore extending axially from the head toward the work penetrating means and terminating with driving and camming surfaces, the body including means weakening the body in a longitudinal direction thus permitting the body to be radially expanded at a predetermined driving force, the weakening means extending from the work penetrating means upwardly at least through the driving and camming surfaces, a driving pin means adapted to be received in the bore and in driving contact with the driving and camming surfaces thereof, the drive pin including a portion extending axially above the head and forming means for driving the assembly, means extending radially outwardly from the shank to prevent the body from expanding until the work penetrating means has penetrated the work, said expansion prevention means being located in generally the same axial location along the shank as the driving and camming surfaces at the extremity of the bore thereby permitting the drive pin means to be driven through the driving and camming surfaces to set the rivet assembly.

2. The rivet assembly of claim 1, wherein the means for preventing expansion extending radially outwardly from the shank in the vicinity of the camming and driving surfaces are generally of the same radial extent as the head.

3. The rivet assembly of claim 1 wherein the weakening means includes a slot extending axially of the shank from the work penetrating means upwardly.

4. The rivet assembly of claim 1, wherein the means for preventing expansion includes a substantially, rigid, washer-like device carried by the shank in the vicinity of the driving and camming surfaces.

5. The rivet assembly of claim 4 which includes slight shoulder means to preposition and locate the washer device in the vicinity of the driving and camming surfaces.

6. The rivet assembly of claim 1 wherein the means for preventing expansion include frangible protuberances extending radially from the shank in the vicinity of the driving and camming surfaces, the protuberances being adapted to bear against the inner wall of a driving chamber in a driving tool while capable of being disassociated from the shank upon contact with the work surface as the shank is driven therethough.

7. The rivet assembly of claim 6 wherein the frangible protuberances are located on opposing sides of the body weakening means so that the protuberances prevent the shank from expanding until the rivet assembly has exited from the driving chamber.

8. The rivet assembly of claim 1 wherein the means for preventing expansion include a substantially rigid washer fitted about the shank in the vicinity of the termination of the bore, the washer having an outer diameter substantially equal to the outer diameter of the head wherein the washer slidably abuts the driving chamber of an associated driving tool thus constraining the drive pin means from driving through the extremity of the bore and expanding the shank prematurely, the washer being driven upwardly beneath the head as the assembly is set.

9. The rivet assembly of claim 8 wherein the washer includes spring tab means which enable the assembly to exert a resilient clamping force on the work surface when the washer and head are seated against the upper surface of the work.

10. A rivet assembly capable of piercing a workpiece and being set in a single operation, including a body member with a shank, a radially enlarged work engaging head at one end and a sharp penetrating point at the other end, a bore extending axially of the shank and terminating in a bottom wall, a drive pin positioned within the bore having one extremity extending axially above the head and forming the means for driving the assembly, the opposite extremity of the pin adapted to abut the bottom wall of the bore to transmit driving force to the body, a slot extending longitudinally of the shank from the sharp penetrating point through the bottom wall of the bore, a rigid ring member surrounding the shank and fitting closely thereon, means on the shank positioning the ring member at essentially the same axial position as the bottom wall, wherein the assembly is adapted to be driven by impact force acting on the driving pin with the ring member constraining the shank from expanding until the point has penetrated the workpiece thereafter the ring may be forced upwardly beneath the head until the head and ring abut the workpiece causing the pin to be driven through the bottom wall to expand the shank beneath the workpiece.

11. A rivet assembly in accordance with claim 10 wherein the ring member is a washer-like device having a radial dimension substantially equal to the radial dimension of the head.

* * * * *